US008885338B1

(12) United States Patent
Simpson et al.

(10) Patent No.: US 8,885,338 B1
(45) Date of Patent: Nov. 11, 2014

(54) COMPUTER TABLET HOLDER

(76) Inventors: Timothy E. Simpson, Greensboro, NC (US); James Meyer, High Point, NC (US)

( * ) Notice: Subject to any disclaimer, the term of this patent is extended or adjusted under 35 U.S.C. 154(b) by 124 days.

(21) Appl. No.: 13/524,488

(22) Filed: Jun. 15, 2012

(51) Int. Cl.
*G06F 1/16* (2006.01)

(52) U.S. Cl.
USPC ..................................... 361/679.59; 224/929

(58) Field of Classification Search
CPC ........... G06F 1/1628; G06F 2200/1633; A45F 2200/0525; A45F 2200/0516
See application file for complete search history.

(56) References Cited

U.S. PATENT DOCUMENTS

| 2,283,988 | A | * | 5/1942 | Heath | 401/6 |
| 5,709,424 | A | * | 1/1998 | Schuler | 294/148 |
| 5,775,497 | A | * | 7/1998 | Krulik | 206/320 |
| 5,941,434 | A | * | 8/1999 | Green | 224/250 |
| 6,578,231 | B1 | * | 6/2003 | Godshaw et al. | 16/114.1 |
| 6,655,540 | B2 | * | 12/2003 | Shimoda et al. | 220/4.02 |
| 6,669,068 | B2 | * | 12/2003 | Kawakita | 224/578 |
| 6,726,070 | B2 | * | 4/2004 | Lautner | 224/221 |
| 6,749,095 | B2 | * | 6/2004 | Johnson | 224/250 |
| 6,896,134 | B2 | * | 5/2005 | Russell et al. | 206/320 |
| 7,080,763 | B2 | * | 7/2006 | Allen et al. | 224/257 |
| 7,469,809 | B2 | * | 12/2008 | Rodarte et al. | 224/578 |
| D655,081 | S | * | 3/2012 | Maravilla et al. | D3/218 |
| 8,550,317 | B2 | * | 10/2013 | Hyseni | 224/197 |
| 8,567,832 | B2 | * | 10/2013 | Kannaka | 294/25 |
| 2002/0044406 | A1 | * | 4/2002 | Shimoda et al. | 361/679 |
| 2004/0013279 | A1 | * | 1/2004 | Takeda | 381/312 |
| 2004/0025993 | A1 | * | 2/2004 | Russell | 150/154 |
| 2007/0008692 | A1 | * | 1/2007 | Staples | 361/683 |
| 2007/0051766 | A1 | * | 3/2007 | Spencer | 224/607 |
| 2007/0205236 | A1 | * | 9/2007 | Partusch | 224/250 |
| 2008/0096620 | A1 | * | 4/2008 | Lee et al. | 455/575.8 |
| 2009/0020570 | A1 | * | 1/2009 | Chan | 224/222 |
| 2011/0266316 | A1 | * | 11/2011 | Ghalib et al. | 224/217 |
| 2012/0024917 | A1 | * | 2/2012 | Case et al. | 224/259 |
| 2012/0037771 | A1 | * | 2/2012 | Kitchen | 248/223.41 |
| 2012/0063066 | A1 | * | 3/2012 | Floit | 361/679.01 |
| 2012/0175396 | A1 | * | 7/2012 | Patino | 224/627 |
| 2012/0267402 | A1 | * | 10/2012 | Beatty | 224/218 |

OTHER PUBLICATIONS

Two (2) page printout from ebay showing a "Hand-e-holder iPad tablet electronic reader kindle holder rotating 360"; undated and five (5) digital pictures indentified as References 1A-1E, comprising various views of the "Hand e-holder" device; undated.
Four (4) page printout from Amazon.com showing "USA Gear TabGRAB Reinforced No-slip Tablet car mount for Amazon Kindle (all generations), Barnes & Noble Nook, Velocity Micro Cruz Reader & Many more eReaders"; undated and three (3) digital pictures identified as References 2A-2C comprising various views of the "TabGRAB"device; undated.

* cited by examiner

*Primary Examiner* — Adrian S Wilson
(74) *Attorney, Agent, or Firm* — Blake P. Hurt

(57) ABSTRACT

A holder for a computer tablet to allow the user greater freedom and movement and is compatible with different tablets having various dimensions. A method provides steps for engaging and disengaging a tablet computer with the holder.

18 Claims, 5 Drawing Sheets

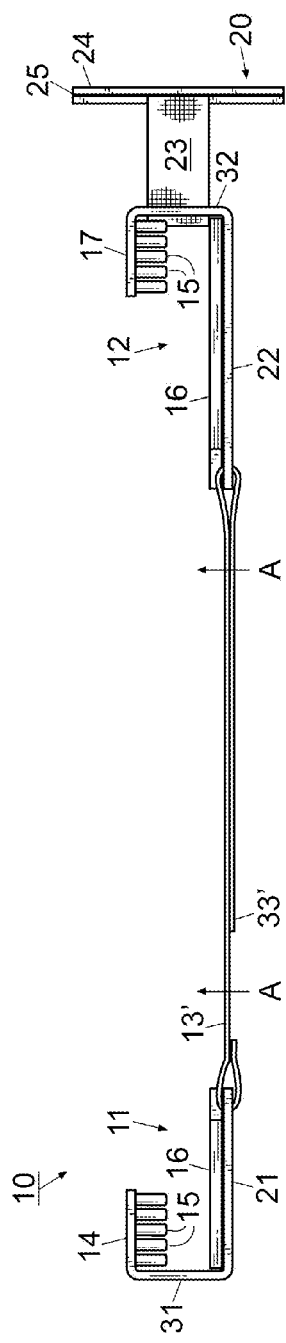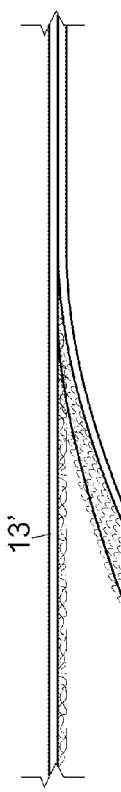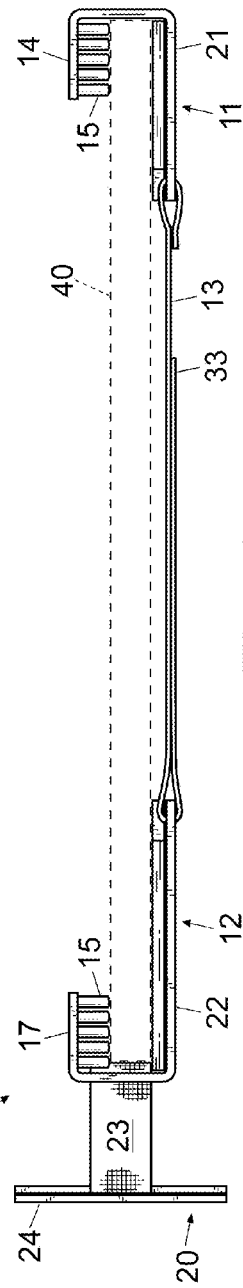

US 8,885,338 B1

COMPUTER TABLET HOLDER

FIELD OF THE INVENTION

The invention herein pertains to tablet computers and particularly pertains to a personal holder for securing a tablet computer during use.

DESCRIPTION OF THE PRIOR ART AND OBJECTIVES OF THE INVENTION

In recent years tablet computers have become increasingly popular due to their lightweight, convenience and mobility. Protection for tablet computers usually consists of a carrying case which prevents damage to the computer during transportation and storage. However, once the computer is removed from the carrying case it is vulnerable to scratches, impacts and the like as it can often slip from the user's hand. Thus in order to prevent damage to tablet computers during handling and use, the present invention was conceived and one of its objectives is to provide a tablet holder which includes a grip for securing it to a user's hand.

It is another objective of the present invention to provide a tablet holder having a pair of rigid J-shaped retainers which are adjustably joined by hook and loop tethers.

It is still another objective of the present invention to provide a tablet holder which is easy to use and relatively low in cost.

It is yet another objective of the present invention to provide a method of using a tablet holder to enable an owner to quickly insert, secure and remove a tablet computer.

Various other objectives and advantages of the present invention will become apparent to those skilled in the art as a more detailed description is set forth below.

SUMMARY OF THE INVENTION

The aforesaid and other objectives are realized by providing an adjustable computer tablet holder which includes a pair of opposing J-shaped retainers adjustably affixed by a pair of hook and loop tethers. Each J-shaped retainer includes at least one tab with flexible fingers depending therefrom to grip the edge of the tablet computer. The retainers are formed from a suitable plastic and one of the retainers has openings formed along one edge for the strap of a grip. The grip can be slid over the user's hand for control and security of the tablet computer and holder during use.

BRIEF DESCRIPTION OF THE DRAWINGS

FIG. 5 illustrates a rear elevational view thereof;

FIG. 5A pictures a sectional view as seen along lines A-A in FIG. 5 with the tether edge peeled away;

FIG. 6 features a front elevational view thereof with a tablet computer shown in dashed lines positioned therein.

DETAILED DESCRIPTION OF THE PREFERRED EMBODIMENT AND OPERATION OF THE INVENTION

Figure 1:
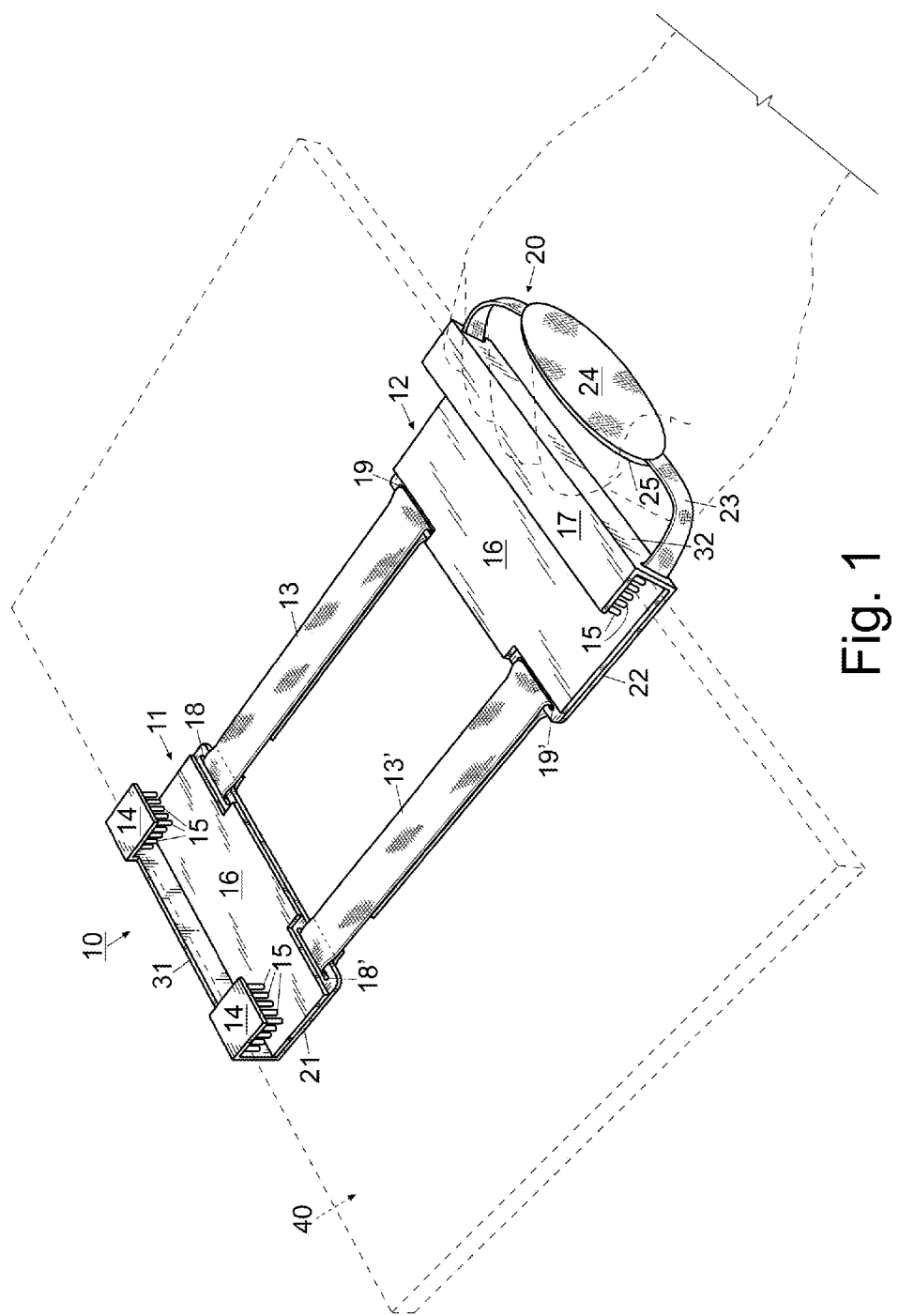
FIG. 1 shows a front perspective view of the tablet holder of the invention with a tablet computer and user's hand seen in dashed lines.

For a better understanding of the invention and its operation, turning now to the drawings, FIG. 1 shows a front perspective view of preferred tablet holder 10 engaging a conventional tablet computer 40 as commercially sold under various names including Apple Ipad, Samsung Galaxy Tab, Maylong Mobility and others. Such tablet computers are versatile and mobile however, due to their size and shape they are prone to slip from the hands of the user causing damage and destruction. In order to increase the convenience and safety during personal use, tablet holder 10 was created and includes a pair of left and right retainers 11, 12 respectively as shown in FIGS. 1, 2, 3, 4, 5, 6 and 7. Retainers 11 and 12 can be molded from a conventional durable plastic or made from suitable metals such as aluminum or the like. Preferably retainers 11 and 12 are formed from a plastic such as polycarbonate for durable, lightweight use.

Retainers 11 and 12 are generally J-shaped as seen in FIGS. 5 and 6. Left retainer 11 includes base 21 which is affixed to side member 31 having a pair of gripping tabs 14, 14 affixed proximate the ends thereof in opposing relation to base 21. Tabs 14, 14 each include a plurality of flexible polymeric fingers 15 depending downwardly therefrom. Base 21 of left retainer 11 includes opposing slots 18, 18' formed therein for attachment of respectively tethers 13, 13' as shown in FIG. 1 and further includes resilient member 16 affixed thereto to allow tablet computer 40 to be frictionally engaged and firmly held in place between fingers 15 of tabs 14, 14 and resilient member 16 on base 21 without slippage.

Figure 2:
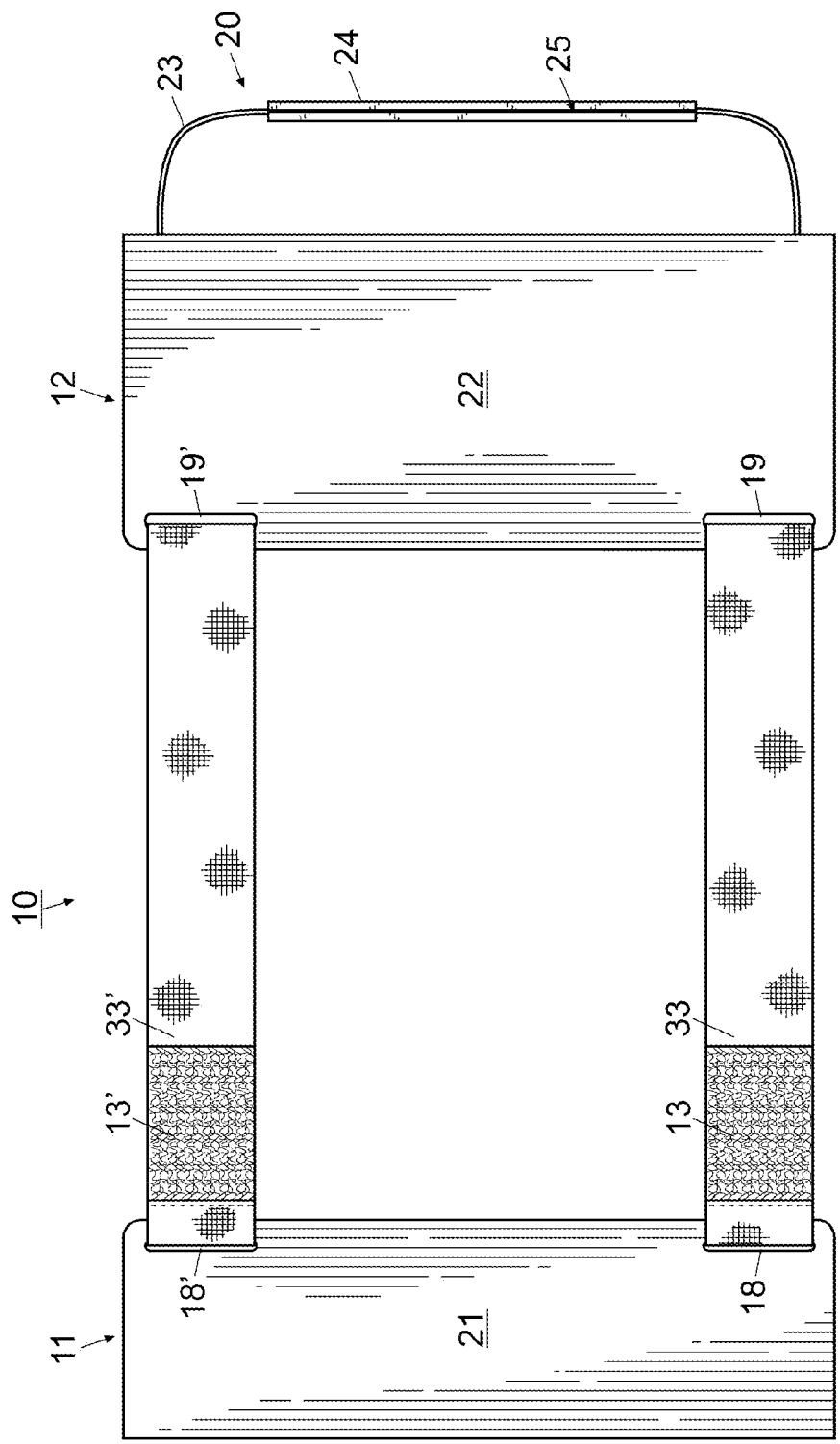
FIG. 2 pictures a bottom plan view of the tablet holder as seen in FIG. 1.
Figure 3:
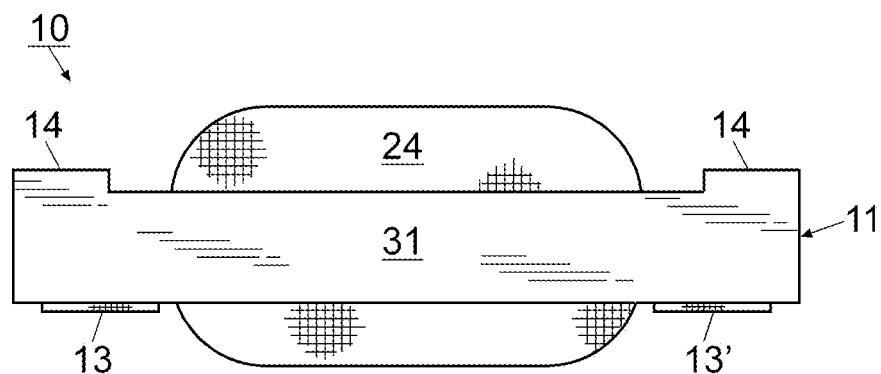
FIG. 3 depicts a left side elevational view thereof.

Right retainer 12 includes base 22 affixed to side member 32 having continuous tab 17 affixed thereto in opposing relation to base 22. Continuous tab 17 likewise includes a plurality of flexible polymeric fingers 15 depending downwardly therefrom as shown in FIGS. 5 and 6. Base 22 of right retainer 12 includes opposing slots 19, 19' formed therein to allow adjustable tethers 13, 13' to pass therethrough as also shown in FIG. 2 and includes a resilient member 16 affixed thereto for engaging tablet computer 40 to hold it securely in place.

As seen in FIGS. 1, 2, 5, 6 and 7, retainer 12 is significantly wider than retainer 11 for durability in use based on the inclusion of grip 20 thereon. The distance between adjustable fingers 15 and resilient members 16 on retainers 11 and 12 may preferably be for example 0.5-0.375 inches (1.27-0.95 cm) for frictionally engaging and accommodating conventional tablet computers.

Tethers 13, 13' are formed from conventional hook and loop straps which are adjustable as seen in FIG. 5A to vary the distance between retainers 11 and 12, depending on the size of the tablet computer being retained therebetween. As shown in FIG. 1, tethers 13, 13' are affixed respectively to slots 18, 18' of retainer 11 and pass through respectively slots 19, 19' of retainer 12 and folded over for attachment as seen in FIGS. 5 and 6 for adjustment purposes and alternatively such positioning could be reversed. As would be understood tethers 13, 13' may also be formed of other materials such as fabric, elastic, nylon or the like and could include alternate fasteners such as buckles, snaps or the like but such is not preferred. Tethers 13, 13' include ends 33, 33' as shown in FIG. 2 and as would be understood when in use, ends 33, 33' would be manually pulled to separate and adjust the distance between retainers 11 and 12.

Figure 4:
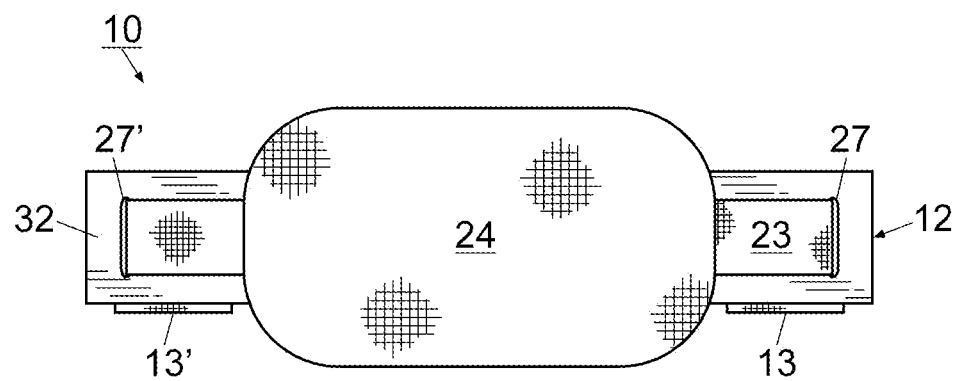
FIG. 4 demonstrates a right side elevational view thereof.
Figure 7:
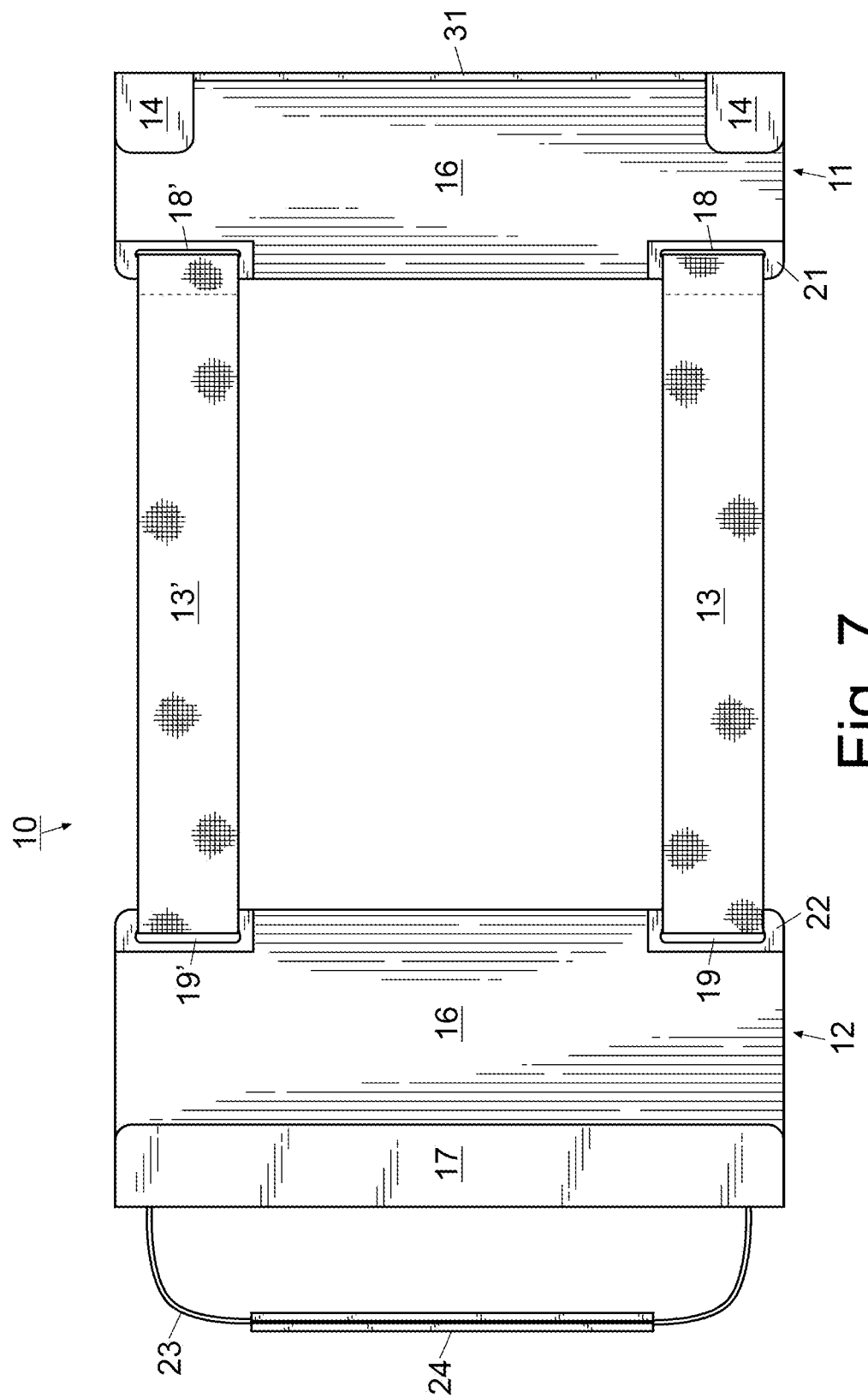
FIG. 7 shows a top plan view of the tablet holder as seen in FIG. 1.

For ease in handling and carrying, grip 20 is affixed to retainer 12 and is positioned in openings 27, 27' in side member 32 as also seen in FIG. 4. Grip 20 consists of an adjustable hook and loop fastening strap 23 and a slideably positioned cushion 24 wrapped therearound. Cushion 24 comprises a durable fabric such as nylon with hook and loop closure 25 which is relatively large in size to protect the user's hand from abrasion during use. As would be understood, strap 23 can be easily adjusted based on the size of the user's hand and cushion 24 easily adjusted therealong for comfort in grasping.

The method of use includes the steps of loosening tethers 13, 13' to further distance retainers 11, 12 from each other whereby tablet computer 40 can be positioned and centered therebetween whereby the sides of tablet computer 40 are frictionally engaged by fingers 15 and resilient members 16 such as seen in FIGS. 1 and 6. Once tablet computer 40 is inserted retainers 11, 12 are drawn together and held in place by pulling ends 33, 33' and securing as conventional such that tethers 13, 13' are taught as seen in FIG. 6. Thereafter, grip 20 is likewise adjusted for the user's hand.

After use, the user's hand is removed from grip 20 and tethers 13, 13' are loosened as conventional by releasing hook and loop tether 13, 13' whereas tablet computer 40 can then be removed from holder 10 and another tablet computer inserted as needed. If desired tablet holder 10 could also remain in place for continuous use as tabs 14, 14 and continuous tab 17 are sized to engage the edges of tablet computer 40 without blocking or interfering with visibility of the screen (not shown).

The illustrations and examples provided herein are for explanatory purposes and are not intended to limit the scope of the appended claims.

We claim:

1. A mobile tablet holder comprising: opposing first and second J-shaped retainers, each of said retainers defining an opening configured to receive a tablet therein and directed at the opposing retainer, a pair of tabs with a plurality of downwardly depending polymeric fingers affixed thereto, said tabs connected to said first retainer, a continuous tab with a plurality of downwardly depending polymeric fingers affixed thereto, said continuous tab connected to said second retainer, two pairs of opposing slots, one of said pairs of slots attached to different ones of said first and second retainers, a tether, said tether adjustably joined to said first retainer and said second retainer, whereby a user engages said tablet holder from a side.

2. The tablet holder of claim 1 further comprising a grip, said grip attached to one of said retainers.

3. The tablet holder of claim 1 wherein said first retainer further comprises a resilient member.

4. The tablet holder of claim 3 wherein said second retainer further comprises a resilient member.

5. The tablet holder of claim 1 wherein said tether comprises a hook and loop strap.

6. The tablet holder of claim 2 wherein said grip comprises an adjustable strap.

7. The tablet holder of claim 6 wherein said grip further comprises a cushion, said cushion mounted on said strap.

8. The tablet holder of claim 7 wherein said cushion is slidable along said strap.

9. The tablet holder of claim 1 wherein said first retainer comprises a plurality of flexible fingers.

10. The tablet holder of claim 1 further comprising an additional tether, said additional tether attached to said first retainer and said second retainer, said retainers oriented parallel to one another.

11. A mobile tablet holder comprising: opposing first and second J-shaped retainers, each of said retainers defining an opening configured to receive a tablet therein and directed at the opposing retainer, a pair of tabs with a plurality of downwardly depending polymeric fingers affixed thereto, said tabs connected to said first retainer, a continuous tab with a plurality of downwardly depending polymeric fingers affixed thereto, said continuous tab connected to said second retainer, two pairs of opposing slots, one of said pairs of slots attached to different ones of said first and second retainers, a tether, said tether adjustably connected to said first retainer and said second retainer, a grip, said grip affixed to one of said retainers, said grip comprising an adjustable strap, whereby a user engages said tablet holder from a side.

12. The tablet holder of claim 11 further comprising a cushion, said cushion slidably affixed to said grip.

13. The tablet holder of claim 11 further comprising a resilient member, said resilient member attached to said first retainer.

14. The tablet holder of claim 13 further comprising a plurality of fingers, said plurality of fingers affixed to said first retainer in opposing relation to said resilient member.

15. In combination a tablet computer and a mobile holder,
a) the table computer having a rectangular shape; and
b) the mobile holder comprising opposing first and second J-shaped retainers, each of said retainers defining an opening configured to receive a tablet therein and directed at the opposing retainer, a pair of tabs with a plurality of downwardly depending polymeric fingers affixed thereto, said tabs connected to said first retainer, a continuous tab with a plurality of downwardly depending polymeric fingers affixed thereto, said continuous tab connected to said second retainer, two pairs of opposing slots, one of said pairs of slots attached to different ones of said first and second retainers, a tether, said tether joined to said first retainer and said second retainer;
said tablet computer engaged by said holder from a side, and whereby said tablet can be positioned in a landscape or portrait orientation for viewing.

16. The combination of claim 15 wherein said holder further comprises a grip, said grip attached to one of said retainers.

17. The tablet holder of claim 3 wherein said second retainer further comprises a resilient member, said second retainer and resilient member wider than said first retainer and resilient member.

18. The tablet holder of claim 13 wherein said second retainer further comprises a resilient member, said second retainer and resilient member wider than said first retainer and resilient member.

* * * * *